US010171762B2

(12) United States Patent
Murao

(10) Patent No.: US 10,171,762 B2
(45) Date of Patent: Jan. 1, 2019

(54) IMAGE SENSING DEVICE

(71) Applicant: Renesas Electronics Corporation, Tokyo (JP)

(72) Inventor: Fumihide Murao, Tokyo (JP)

(73) Assignee: Renesas Electronics Corporation, Tokyo (JP)

( * ) Notice: Subject to any disclaimer, the term of this patent is extended or adjusted under 35 U.S.C. 154(b) by 0 days.

(21) Appl. No.: 15/364,482

(22) Filed: Nov. 30, 2016

(65) Prior Publication Data

US 2017/0187972 A1 Jun. 29, 2017

(30) Foreign Application Priority Data

Dec. 28, 2015 (JP) .................................. 2015-256229

(51) Int. Cl.
*H04N 5/363* (2011.01)
*H04N 5/374* (2011.01)
*H04N 5/3745* (2011.01)

(52) U.S. Cl.
CPC ........... *H04N 5/363* (2013.01); *H04N 5/3745* (2013.01); *H04N 5/37457* (2013.01)

(58) Field of Classification Search
CPC ...... H04N 5/363; H04N 5/374; H04N 5/3745; H04N 5/37457; H01L 27/14643; G11C 13/0097; G11C 11/56
See application file for complete search history.

(56) References Cited

U.S. PATENT DOCUMENTS

| 2005/0083408 A1* | 4/2005 | Mabuchi | H04N 5/357 348/207.99 |
| 2013/0093927 A1* | 4/2013 | Yamada | H04N 5/378 348/241 |
| 2013/0248685 A1* | 9/2013 | Ahn | H01L 27/14665 250/208.1 |

FOREIGN PATENT DOCUMENTS

JP 4048415 B2 2/2008

* cited by examiner

Primary Examiner — Nhan T Tran
(74) Attorney, Agent, or Firm — Sughrue Mion, PLLC

(57) ABSTRACT

A conventional image sensing device has a problem of a large variation of a reset voltage of a floating diffusion. According to an embodiment, an image sensing device includes a reset circuit switching a voltage to be supplied to a floating diffusion when the floating diffusion is reset. In a first reset operation (PD reset) performed prior to a light-exposure period for exposing a photoelectric conversion element with light, the reset circuit supplies a first reset voltage generated based on a power-source voltage to the floating diffusion. In a second reset operation (FD reset) performed during the light-exposure period for exposing the photoelectric conversion element with the light, the reset circuit supplies a second reset voltage generated based on a reset correction voltage lower than the power-source voltage to the floating diffusion, and then supplies the first reset voltage.

13 Claims, 14 Drawing Sheets

IMAGE SENSING DEVICE

CROSS-REFERENCE TO RELATED APPLICATIONS

The disclosure of Japanese Patent Application No. 2015-256229 filed on Dec. 28, 2015 including the specification, drawings and abstract is incorporated herein by reference in its entirety.

BACKGROUND

The present invention relates to an image sensing device, and relates to an image sensing device that resets a floating diffusion in which electric-charge are hold prior to reading out of charge signal from a photodiode, for example.

These days an imaging device, such as a camera, uses a CMOS sensor as an image sensing device and outputs an image acquired by the image sensing device as captured data. An example of the image sensing device is disclosed in Japanese Patent No. 4048415.

The image sensing device described in Japanese Patent No. 4048415 includes a photoelectric conversion element that generates electric-charge corresponding to an amount of received light, a transfer gate unit that transfers the electric-charge generated by the photoelectric conversion element to a floating diffusion, an amplifier that outputs an electric signal corresponding to a voltage of the floating diffusion to an output signal line, and a reset unit that resets the voltage of the floating diffusion.

SUMMARY

The image sensing device of Japanese Patent No. 4048415 uses, as the reset unit, an NMOS transistor (hereinafter, referred to as a reset transistor) in which a source is coupled to the floating diffusion and a power-source voltage is supplied to a drain. Also, in the image sensing device of Japanese Patent No. 4048415, before the voltage of the floating diffusion is reset, a first reset operation is performed in which the floating diffusion and the photoelectric conversion element are reset. Thereafter, before the electric-charge is read out from the photoelectric conversion element, a second reset operation is performed in which the floating diffusion is reset again. In a case where those reset operations are performed, a leak current flows into the floating diffusion from the reset transistor during a period between the first reset operation and the second reset operation, causing increase of the voltage of the floating diffusion. Therefore, with the technique described in Japanese Patent No. 4048415, it is impossible to raise a gate-source voltage of the reset transistor to a threshold voltage or higher in the second reset operation, so that the floating diffusion cannot be reset to an intended voltage.

Other problems and novel features will be apparent from the description of this specification and the accompanying drawings.

According to an embodiment, an image sensing device includes a reset circuit that switches a voltage to be supplied to a floating diffusion when the floating diffusion is reset. The reset circuit supplies a first reset voltage generated based on a power-source voltage to the floating diffusion in a first reset operation performed prior to a light-exposure period in which a photoelectric conversion element is exposed with light. In a second reset operation performed during the light-exposure period in which the photoelectric conversion element is exposed with light, the reset circuit supplies a second reset voltage generated based on a reset correction voltage lower than the power-source voltage to the floating diffusion and then supplies the first reset voltage.

According to the embodiment, the image sensing device can eliminate a shift of the reset voltage of the floating diffusion.

DETAILED DESCRIPTION

First Embodiment

Figure 1:
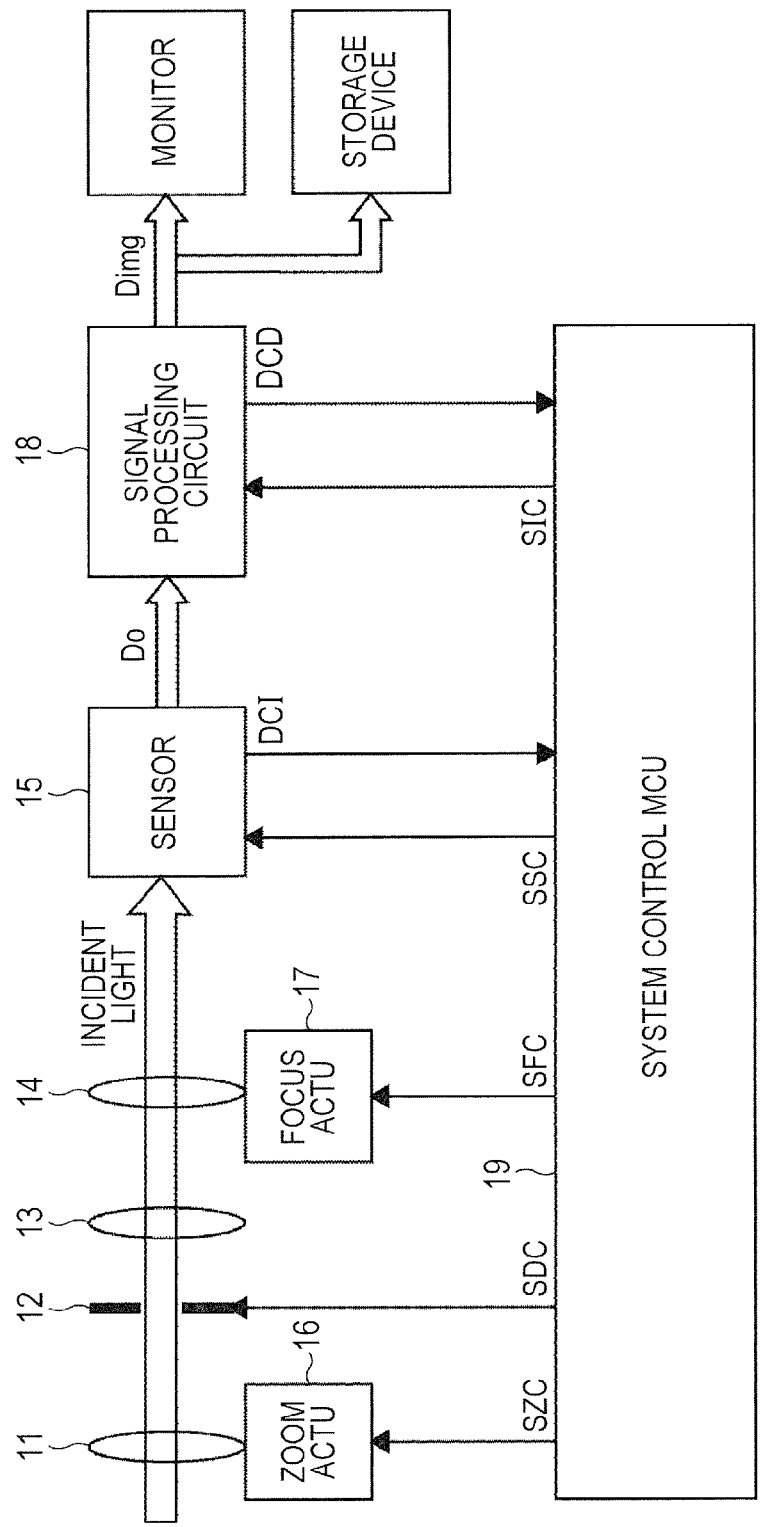
FIG. 1 is a block diagram of a camera system including an image sensing device according to a first embodiment.

In the following description and the drawings, omission and simplification are made for clarifying explanation, as appropriate. Further, in the drawings, the same component is labeled with the same reference numeral, and redundant description is omitted as necessary.

<Description of Camera System>

FIG. 1 is a block diagram of a camera system 1 according to a first embodiment. As illustrated in FIG. 1, the camera system 1 includes a zoom lens 11, a diaphragm 12, a fixed lens 13, a focus lens 14, an image sensing device 15, a zoom-lens actuator 16, a focus-lens actuator 17, a signal processing circuit 18, a system control MCU 19, a monitor, and a storage device. The monitor an, the storage device are for confirming and storing an image captured by the camera system 1, and may be provided on a separate system from the camera system 1.

The zoom lens 11, the diaphragm 12, the fixed lens 13, and the focus lens 14 form a lens group of the camera system 1. A position of the zoom lens 11 can be changed by the zoom-lens actuator 16. A position of the focus lens 14 can be changed by the focus-lens actuator 17. In the camera system 1, the lenses are moved by the associated actuators, respectively, to change a zoom magnification and a focus, and the diaphragm 12 is operated to change an amount of incident light.

The zoom-lens actuator 16 moves the zoom lens 11 based on a zoom control signal SZC output from the system control MCU 19. The fools-lens actuator 17 moves the focus lens 14 based on a focus control signal SFC output from the system control MCU 19. The diaphragm 12 adjusts an aperture amount by a diaphragm control signal SDC output from the system control MCU 19.

The image sensing device 15 includes a light-receiving element, such as a photodiode, and converts light-receiving pixel signal acquired from the light-receiving element to a digital value and outputs image data Do. Also, the image sensing device 15 analyzes the image data Do output from the image sensing device 15 to output image character data DCI representing characteristics of the image data Do. This image character data DCI contains two images acquired in an autofocus process described later. Further, the image sensing device 15 performs gain control of the image data Do for every pixel, light-exposure control of the image data Do, and HDR (High Dynamic Range) control of the image data. Do based on a sensor control signal SSC supplied from the system control MCU 19. The details of the image sensing device 15 will be described later.

The signal processing circuit 18 performs image processing, e.g., image correction, for the image data Do received from the image sensing device 15 and outputs image data Dimg. The signal processing circuit 18 analyzes the received image data Do and outputs color space data DCD. The color space data DCD contains brightness information and color information of the image data Do, for example.

The system control MCU 19 controls focusing of the lens group based on the image character data DCI output from the image sensing device 15. More specifically, the system control MCU 19 outputs the focus control signal SFC to the focus-lens actuator 17, thereby controlling focusing the lens group. The system control MCU 19 outputs the diaphragm control signal SDC to the diaphragm 12 to adjust the aperture amount of the diaphragm 12. Further, the system control MCU 19 generates the zoom control signal SZC in accordance with a zoom instruction provided from the outside and outputs the zoom control signal SZC to the zoom-lens actuator 16, thereby controlling the zoom magnification of the lens group.

More specifically, when the zoom lens 11 is moved the zoom-lens actuator 16, the focus is shifted. Therefore, the system control MCU 19 calculates a positional phase difference between two objects based on the two images contained in the image character data DCI acquired from the image sensing device 15, and calculates a defocus amount of the lens group based on this positional phase difference. The system control MCU 19 automatically adjusts the focus in accordance with this defocus amount. This process is referred to as autofocus control.

Also, tale system control MCU 19 calculates an exposure control value instructing light-exposure setting of the image sensing device 15 based on the brightness information contained in the color space data DCD output from the signal processing circuit 18, and controls the light-exposure setting and gain setting of the image sensing device 15 to bring the brightness information contained in the color space data DCD output from the signal processing circuit 18 closer to the exposure control value. In this control, the system control MCU 19 may calculate a control value of the diaphragm 12 when the light-exposure setting is changed.

Further, the system control MCU 19 outputs a color space control signal SIC that adjusts brightness or a color of the image data Dimg based on an instruction from a user. The system control MCU 19 generates the color space control signal SIC based on a difference between the color space data DCD acquired from the signal processing circuit 18 and information provided from the user.

The camera system 1 according to the first embodiment has one of features in a method of controlling the image sensing device 15 when the image sensing device 15 acquires the image data Do in the autofocus process. Therefore, the image sensing device 15 is described in more detail below.

<Description Related to Operation of Image Sensing Device>

Figure 2:
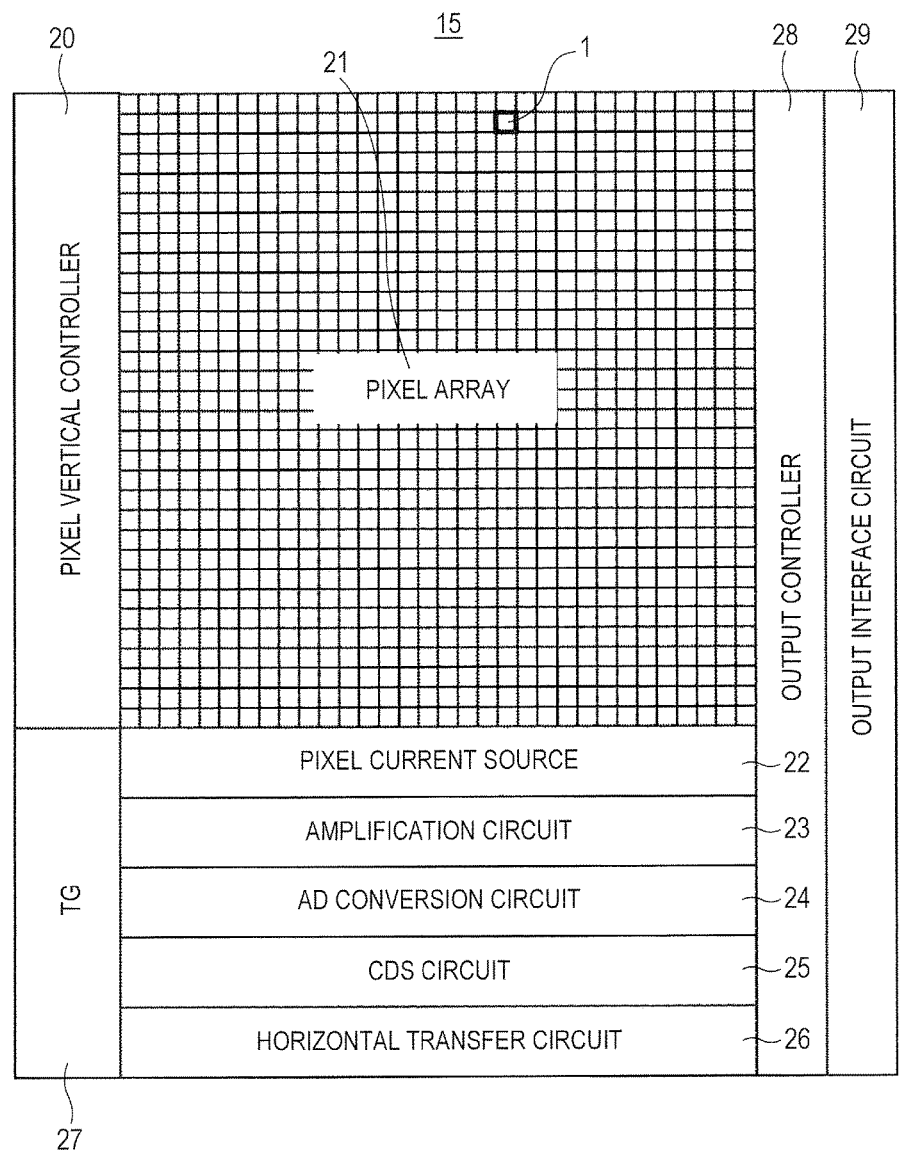
FIG. 2 schematically illustrates a floor layout of the image sensing according to the first embodiment.

FIG. 2 schematically illustrates a portion of a floor layout of an image sensing device according to the first embodiment. FIG. 2 only illustrates a floor layout of a pixel vertical controller 20, a pixel array 21, a pixel current source 22, an amplification circuit 23, an AD (Analog to Digital) conversion circuit 24, a CDS (Correlated Double Sampling) circuit 25, a horizontal transfer circuit 26, a timing generator 27, an output controller 28, and an output interface circuit 29, in the floor layout of the image sensing device 15.

The pixel vertical controller 20 controls operations of pixel units arranged in a grid in the pixel array 21 on a row-by-row basis. The pixel current source 22 includes current sources provided for each column of the pixel units arranged in the pixel array 21. The amplification circuit 23 perform gain adjustment of pixel signal read out from a pixel unit. The AD conversion circuit 24 converts the pixel signal subjected to the gain adjustment by the amplification circuit 23, to a digital value. The CDS circuit 25 subtracts a reset level from a signal level of the pixel signal to remove noise from the pixel signal. The horizontal transfer circuit 26 transfers the pixel signal from which the noise has been removed by the CDS circuit 25 to the output controller 28 in the order from the pixel signal of the pixel unit closest to the output controller 28. The timing generator 27 controls respective timings at which the pixel vertical controller 20, the pixel current source 22, the amplification circuit 23, the AD conversion circuit 24, and the CDS circuit 25 operate. The output controller 28 outputs the pixel signal transferred by the horizontal transfer circuit 26, to the output interface circuit 29. The output interface circuit 9 is an output interface circuit of the image sensing device 15.

<Description of Configuration of Pixel Unit>

Figure 3:
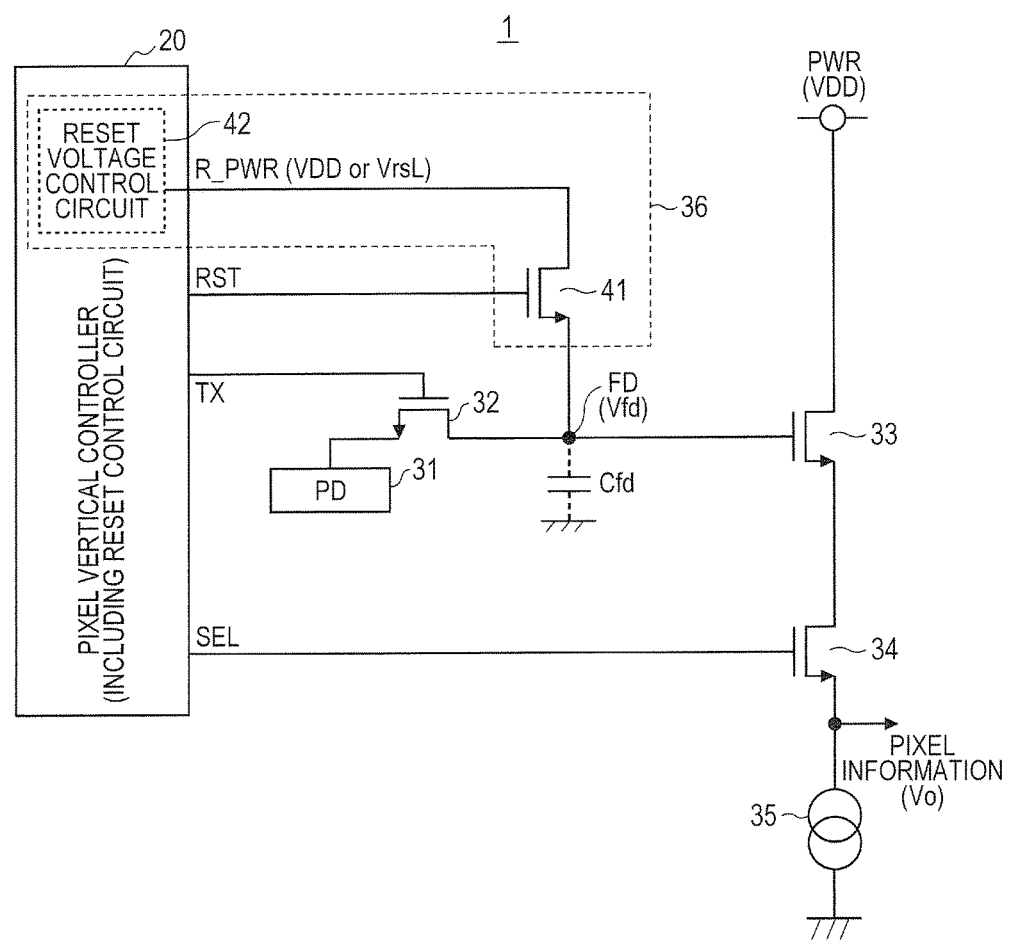
FIG. 3 is a circuit diagram of a pixel unit of the image sensing device according to the first embodiment.

The image sensing device according to the first embodiment has one of features in the pixel units arranged in the pixel array 21. Therefore, the pixel unit is described in detail below. FIG. 3 is a circuit diagram of a pixel unit 1 according to the first embodiment. In FIG. 3, the pixel vertical controller 20 is illustrated for explaining a control signal provided to each element of the pixel unit 1. Also, a current source 35 is illustrated in FIG. 3, which is coupled to an output wire of the pixel unit 1. This current source 35 is one of the current sources included in the pixel current source 22 in FIG. 2. Further, in FIG. 3, a sign indicating a voltage used in the following description is shown with parentheses.

As illustrated in FIG. 3, the pixel unit 1 according to the first embodiment includes a photoelectric conversion element (e.g., a photodiode 31), a transfer transistor 32, an amplification transistor 33, a selection transistor 34, and a reset circuit 36.

The photodiode 31 generates electric-charge corresponding to an amount of light incident on the image sensing device 15. The transfer transistor 32 reads out the electric-charge from the photodiode 31. In the transfer transistor 32, the photodiode 31 is coupled to a source, a drain is coupled to a floating diffusion FD, and a read-out control signal TX is supplied to a gate. The floating diffusion FD holds therein the electric-charge read out via the transfer transistor 32. The amplification transistor 33 is coupled to the floating diffusion FD at its gate, is coupled to a power-source wire PWR at its drain, and is coupled to the output wire at its source. The amplification transistor 33 outputs pixel signal Vo having a voltage corresponding to an amount of the electric-charge held in the floating diffusion FD. The selection transistor 34 is provided between the source of the amplification transistor 33 and the output wire. A selection signal SEL is supplied to a gate of the selection transistor 34. In the pixel unit 1, wire through which the pixel signal Vo is propagated is the output wire, and s provided in common to pixel units arranged in the same row in the pixel array 21. The current source 35 is provided between the selection transistor and a ground wire through which a ground voltage is propagated.

The reset circuit 36 switches a voltage to be supplied to the floating diffusion FD when the floating diffusion FD is reset. The reset circuit 36 includes a reset transistor 41 and a reset voltage control circuit 42. The reset transistor 41 is coupled to a reset power-source wire R_PWR at its drain and to the floating diffusion FD at its source, and a reset control signal RST is supplied to its gate. The reset transistor 41 switches a voltage to be supplied to the drain of the reset transistor 41 via the reset power-source wire R_PWR. In the pixel unit 1 according to the first embodiment, the reset power source wire R_PWR is provided separately from the power-source wire PWR. Thus, in the pixel unit 1 according to the first embodiment, a voltage different from a power source voltage VDD is supplied to the drain of the reset transistor 41 in an operation resetting the floating diffusion. FD.

In the example of FIG. 3, the pixel vertical controller 20 outputs the read-out control signal TX, the selection signal SEL, the reset control signal RST, and the voltage to be supplied to the drain of the reset transistor 41 via the reset power-source wire R_PWR. This is because these signals and voltage are supplied in common to the pixel units 1 arranged in the same line in the pixel array 21. The pixel vertical controller 20 includes a reset control circuit outputting the reset control signal RST. It is assumed that in the example of FIG. 3, the reset voltage control circuit 42 is included in the pixel vertical controller 20.

The reset control circuit supplies the reset control signal RST to the reset circuit 36 to make the reset circuit perform the following operation. In a first reset operation that resets the floating diffusion FD and the photoelectric conversion element prior to a light-exposure period for exposing the photodiode 31 with light, the reset circuit 36 supplies a first reset voltage generated based on the power-source voltage VDD to the floating diffusion FD, based on the reset control signal RST. In a second reset operation that resets the floating diffusion FD during the light-exposure period for exposing the photodiode 31 with light, the reset circuit 36 supplies a second reset voltage generated based on a reset correction voltage VrsL lower than the power-source voltage VDD to the floating diffusion FD, and then supplies the first reset voltage to the floating diffusion FD. In the pixel 1 according to the first embodiment, the reset correction voltage VrsL is set to be lower than a voltage obtained by subtracting a threshold voltage Vth of the reset transistor 41 from the power-source voltage VDD.

Figure 4:
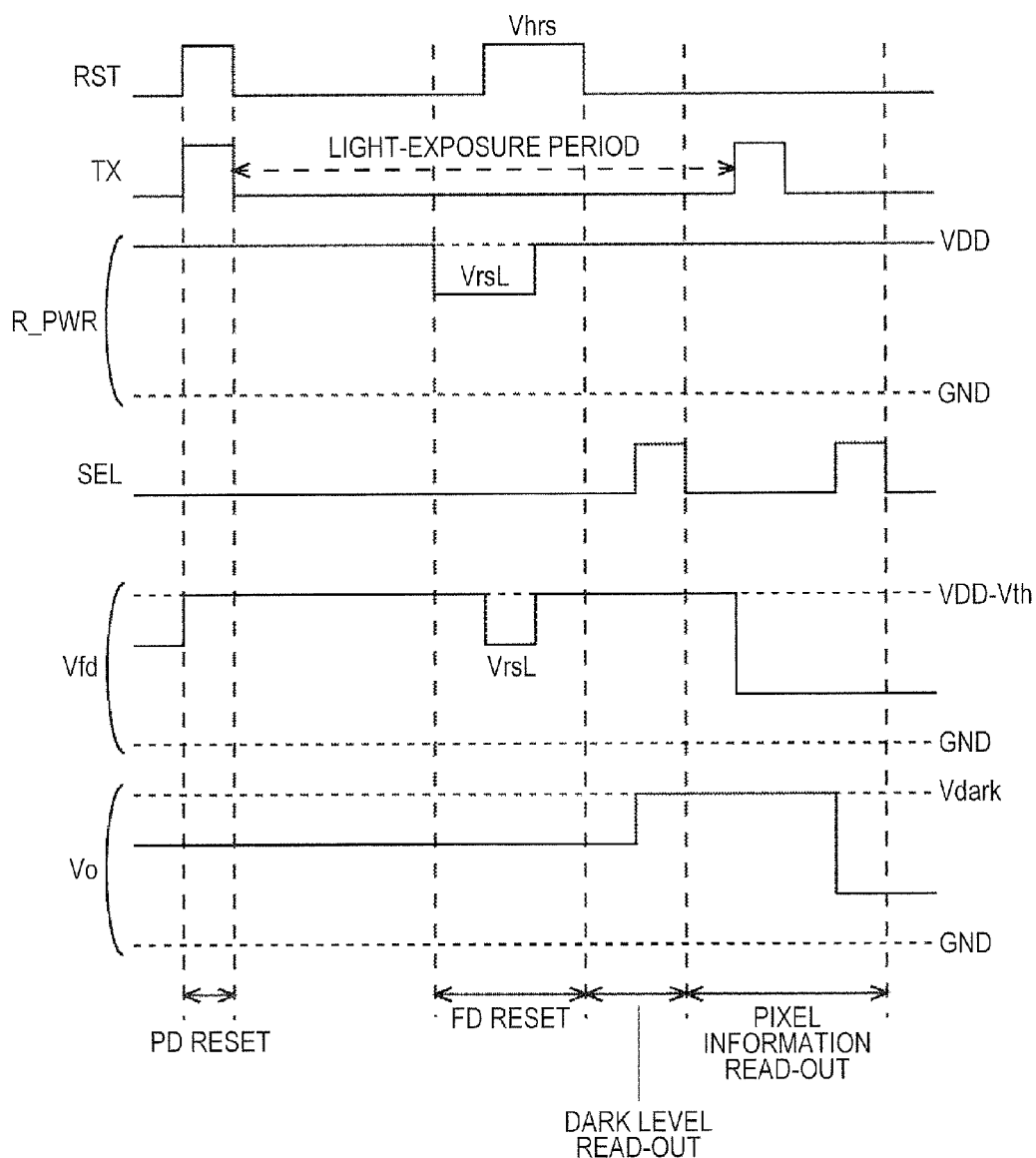
FIG. 4 is a timing chart illustrating an operation of the pixel unit of the image sensing device according to the first embodiment.

Next, an operation of the pixel unit 1 according to the first embodiment described. FIG. 4 a timing chart illustrating the operation of the pixel unit of the image sensing device according to the first embodiment. Note that the timing chart of FIG. 4 only illustrates an operation that reads out the pixel signal Vo from the pixel unit 1 in the image sensing device.

As illustrated in FIG. 4, in the pixel unit 1 according to the first embodiment, a light-exposure operation for the photodiode 31 is performed upon completion of the first reset. Operation (e.g., PD reset). Also, the pixel unit 1 according to the first embodiment performs the second reset operation (e.g., FD reset) during the light-exposure period. The pixel unit 1 according to the first embodiment then performs a dark level read-out operation after completion of the FD reset. Thereafter, the pixel unit 1 according to the first embodiment performs an operation of reading out pixel signal. This series of operations of the pixel unit 1 according to the first embodiment is described in detail below.

First, in the PD reset, the pixel vertical controller 20 switches the reset control signal RST and the read-out control signal TX from a low level (e.g., a ground voltage) to a high level (e.g., the power-source voltage VDD), to turn on the reset transistor 41 and the transfer transistor 32. Also, in the PD reset, the reset voltage control circuit 42 supplies the power-source voltage VDD to the drain of the reset transistor 41 via the reset power-source wire R_PWR. Thus, the first reset voltage (VDD−Vth) obtained by subtracting the threshold voltage Vth of the reset transistor 41 from the power-source voltage VDD is supplied to the floating diffusion FD and the photodiode 31. By this operation, in the PD reset, electric-charge held in the photodiode 31 during a previous cycle are discharged, so that the photodiode 31 is reset. The pixel vertical controller 20 then switches the reset control signal RST and the read-out control signal TX from the high level to the low level, thereby ending the PD reset. With turning-off of the transfer transistor 32, light exposure for the photodiode 31 is started.

In the FD reset, first, the reset voltage control circuit 42 in the pixel vertical controller 20 sets the voltage to be supplied to the drain of the reset transistor 41 via the reset power-source wire R_PWR to the reset correction voltage VrsL. This reset correction voltage VrsL is lower than a voltage Vhrs of the reset control signal RST the pixel vertical controller 20 supplies to the reset transistor 41 during an FD reset period, by the threshold voltage Vth of the reset transistor 41 or higher. That is, the reset correction voltage VrsL is set to satisfy VrsL<Vhrs−Vth. While the reset correction voltage VrsL is supplied to the drain of the reset transistor 41, the pixel vertical controller 20 switches the reset control signal RST from the low level (e.g., the ground voltage) to the high level (e.g., the voltage hrs). This voltage Vhrs is set to be the same potential as the power-source voltage VDD, for example. Due to this, a voltage Vfd of the floating diffusion FD, from which electric-charge are drawn out towards the reset power-source wire R_PWR (that is, from the source to the drain of the reset transistor 41), becomes the second reset voltage (e.g., the reset correction voltage VrsL).

Further, in the FD reset, after the voltage Vfd of the floating diffusion FD is set to the reset correction voltage VrsL, while the pixel vertical controller 20 keeps the reset transistor 41 in an on state, the reset voltage control circuit 42 switches the voltage to be supplied to the drain of the reset transistor 41 to the power-source voltage VDD. Thus, the voltage Vfd of the floating diffusion FD becomes the first reset voltage (VDD−Vth) obtained by subtracting the threshold voltage Vth of the reset transistor 41 from the power-source voltage VDD. By switching of the reset control signal RST from the high level to the low level by the pixel vertical controller 20, the FD reset that resets the floating diffusion FD is completed.

In the dark level read-out operation, a voltage level of the reset floating diffusion FD is read out as a value of a dark level. Specifically, in the dark level read-out operation, the selection signal SEL is switched from a low level to a high level, and a dark-level voltage Vdark corresponding to the voltage level of the floating diffusion FD in a reset state is read out as pixel signal Vo.

In the pixel signal read-out operation, first, the read-out control signal TX is switched from the low level to the high level, so that the electric-charge held in the photodiode 31 are read out to the floating diffusion FD. This decreases the potential of the floating diffusion FD. Thereafter the read-out control signal TX is switched from the high level to the low level, and the selection signal SEL is then switched from the low level to the high level. Consequently, pixel signal Vo generated based on the electric-charge read out to the floating diffusion FD is output to the output wire.

As described above, in the pixel unit 1 according to the first embodiment, all of the reset control signal RST, the read-out control signal TX, the selection signal SEL, and the voltage supplied to the drain of the reset transistor 41 via the reset power-source wire R_PWR are the power-source voltage VDD or lower.

From the above description, in the pixel unit 1 according to the first embodiment, in the FD reset, the voltage of the floating diffusion FD is once set to the reset correction voltage VrsL lower than the voltage (VDD−Vth) obtained by subtracting the threshold voltage Vth of the reset transistor 41 from the power-source voltage VDD. Also, in the pixel unit 1 according to the first embodiment, after being reset with the reset voltage VrsL, the floating diffusion FD is reset with the first reset voltage obtained by subtracting the threshold voltage Vth from the power-source voltage VDD. Thus, the pixel unit 1 according to the first embodiment can reduce a variation of the reset level without being affected by a leak current of the reset transistor 41 flowing to the floating diffusion FD in the FD reset.

Here, the variation of the reset level of the floating diffusion FD is specifically described. As illustrated in FIG. 4, it takes a predetermined time from a completion of the PD reset to a start of the FD reset. Therefore, even if the voltage level of the floating diffusion FD could be set to the reset level in the PD reset, when the leak current flows into the floating diffusion FD via the reset transistor 41 between completion of the PD reset and the start of the FD reset, the voltage Vfd of the floating diffusion FD may become higher than the voltage obtained by subtracting the threshold voltage Vth of the reset transistor 41 from the power-source voltage VDD. In a case where the reset control signal RST that has the same potential as the power-source voltage VDD is supplied to the gate of the reset transistor 41 in which the power-source voltage VDD is supplied to the drain, while the above increase of the voltage Vfd occurs, a voltage across the gate and the source of the reset transistor 41 becomes the threshold voltage Vth or lower, so that the reset transistor 41 is not turned on. Therefore, when the increase of the voltage Vfd has occurred because of the leak current, the voltage Vfd of the floating diffusion FD cannot be reset to an intended reset level in the FD reset. Further, the leak current of the reset transistor 41 has a variation by a temperature, a variation by a process, and a variation by the power-source voltage, and therefore the variation of the reset level of the floating diffusion FD is caused depending on these factors causing the variation.

However, in the pixel unit 1 according to the first embodiment, in the FD reset, the voltage Vfd of the floating diffusion FD is once lowered to the second reset voltage (e.g., the reset correction voltage VrsL) lower than the reset level, and thereafter a reset operation for the floating diffusion FD that is to be originally performed is performed. Due to this, the pixel unit 1 according to the first embodiment can reduce the variation of the reset level of the floating diffusion FD caused by the leak current of the reset transistor 41.

Further, in the pixel unit 1 according to the first embodiment, the maximum values of the voltages respectively supplied to the gates of the transfer transistor 32, the amplification transistor 33, the selection transistor 34, and the reset transistor 41 become the power-source voltage VDD. That is, the pixel unit 1 according to the first embodiment can use a transistor forming the pixel unit 1 within a voltage range for compensation of a breakdown voltage without applying an overvoltage to the transistor. This can improve reliability of the image sensing device 15 in the pixel unit 1 according to the first embodiment. In addition, the pixel unit 1 according to the first embodiment can use a usual element having a breakdown voltage corresponding to the power-source voltage VDD without using a breakdown-voltage element that can withstand application of a voltage higher than the power-source voltage VDD. Therefore, the circuit scale can be reduced.

A problem related to this overvoltage is specifically described. As one method for reducing the variation of the reset level of the floating diffusion FD without being affected by the aforementioned increase of the voltage Vfd of the floating diffusion FD based on the leak current of the reset transistor 41, a method can be considered in which the voltage of the reset control signal RST to be supplied to the gate of the reset transistor 41 in the FD reset is set to be higher than the power-source voltage VDD. However, in a case where the voltage of the reset control signal RST is set to be higher than the power-source voltage VDD, the voltage applied across the gate and the source, a voltage across the gate and a back gate, and the like in the reset transistor 41 may exceed a breakdown voltage determined for the reset transistor 41 to cause breakdown of the reset transistor 41. In order to prevent this breakdown of the reset transistor 41, it is necessary to use a transistor with a high breakdown voltage as the reset transistor 41.

In the pixel unit 1 according to the first embodiment, however, the variation of the reset level of the floating diffusion FD can be reduced even if the maximum voltage of each control signal is set to the power-source voltage VDD. Therefore, the pixel unit 1 according to the first embodiment can be formed only by transistors with a breakdown voltage that matches the power-source voltage VDD. Further, by avoiding application of the overcurrent, the pixel unit 1 according to the first embodiment can have improved reliability.

Figure 13:
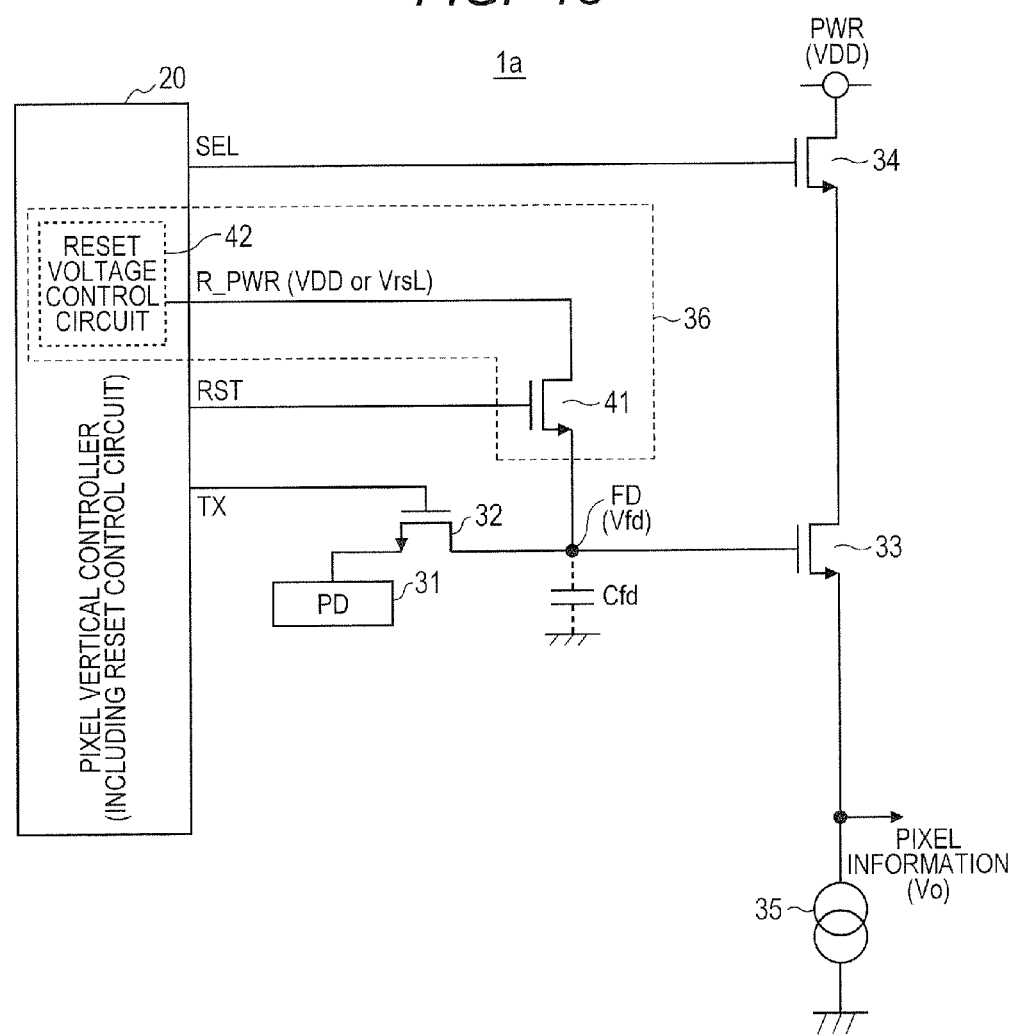
FIG. 13 is a circuit diagram of a modified example of the pixel unit of the image sensing device according to the first embodiment.

In addition, FIG. 13 is a circuit diagram of a pixel unit 1a that is a modification of the pixel unit 1 according to the first embodiment. The pixel unit 1a illustrated in FIG. 13 is configured so that the selection transistor is coupled between the power-source line PWR and the drain of the amplification transistor 33. Also in this pixel unit 1a, by supplying the reset correction voltage VrsL to the source of the reset transistor 41, it is possible to reduce the effect of the leak current of the reset transistor 41 as in the pixel unit 1 according to the first embodiment, thus reducing the variation of the reset level. Further, also in embodiments described later, the amplification transistor and the selection transistor can be switched.

Second Embodiment

Figure 5:
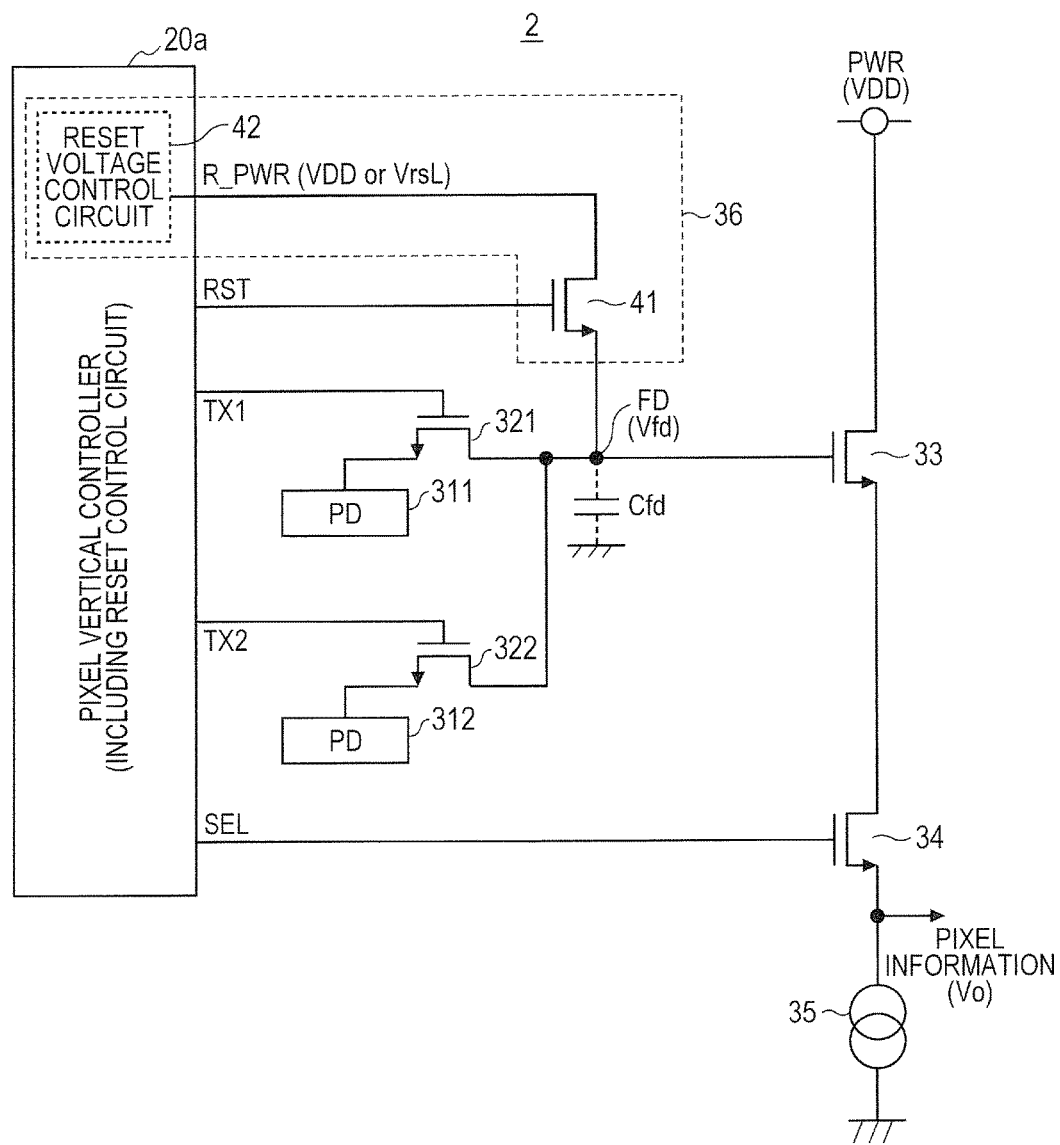
FIG. 5 is a circuit diagram of a pixel unit of an image sensing device accord to a second embodiment.

In a second embodiment, a pixel unit. 2 is described, which is a different embodiment from the pixel unit 1 according to the first embodiment. FIG. 5 is a circuit diagram of the pixel unit 2 of an image sensing device according to the second embodiment.

As illustrated in FIG. 5, the pixel unit 2 according to the second embodiment is obtained by adding another pair of the photodiode 31 and the transfer transistor 32 to the pixel unit 1 according to the first embodiment. In FIG. 5, the photodiode 31 and the transfer transistor 32 described in the first embodiment are labeled with 311 and 321, respectively. Also, in FIG. 5, the photodiode 31 and the transfer transistor 32 added in the second embodiment are labeled with 312 and 322, respectively. Further, a read-out control signal to be supplied to the transfer transistor 321 is labeled with TX1, and a read-out control signal to be supplied to the transfer transistor 322 is labeled with TX2.

Figure 6:
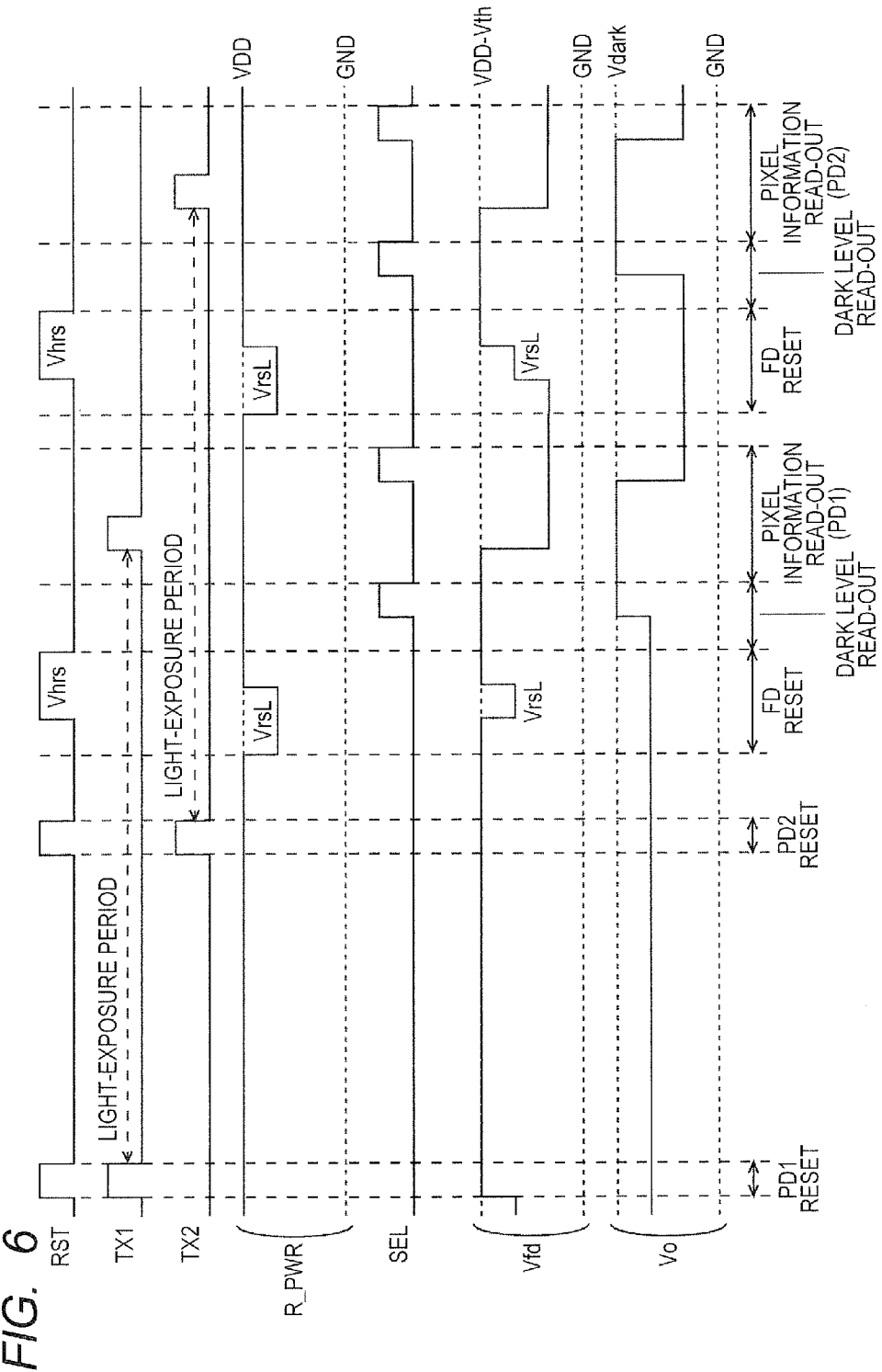
FIG. 6 is a timing chart illustrating an operation of the pixel unit of the image sensing device according to the second embodiment.

Next, an operation of the pixel unit 2 according to the second embodiment is described. FIG. 6 is a timing chart explaining the operation of the pixel unit of the image sensing device according to the second embodiment.

As illustrated in FIG. 6, in the pixel unit 2 according to the second embodiment, PD1 reset and PD2 reset are performed in order, so that the photodiodes 311 and 312 are reset in order. These PD1 reset and PD2 reset are the same operation as, the PD reset described referring to FIG. 4.

In the second embodiment, after completion of reset of the two photodiodes, FD reset, a dark level read-out operation, and a pixel signal read-out operation are performed in that order in order to read out pixel signal from the photodiode 311 that has been reset first. After completion of reading out of the pixel signal from the photodiode 311, the FD reset, the dark level read-out operation, and the pixel signal read-out operation are performed in that order in order to read out pixel signal from the photodiode 312. Also in the second embodiment, the FD reset, the dark level read-out operation, and the pixel signal read-out operation are substantially the same as the FD reset, the dark level read-out operation, and the pixel signal read-out operation in the first embodiment described referring to FIG. 4.

From the above description, in the second embodiment, it suffices that one set of the amplification transistor 33, the selection transistor 34, and the reset circuit 36 is provided for two photodiodes. Therefore, the number of transistors required for one photodiode can be reduced, so that the circuit scale can be reduced.

Third Embodiment

Figure 7:
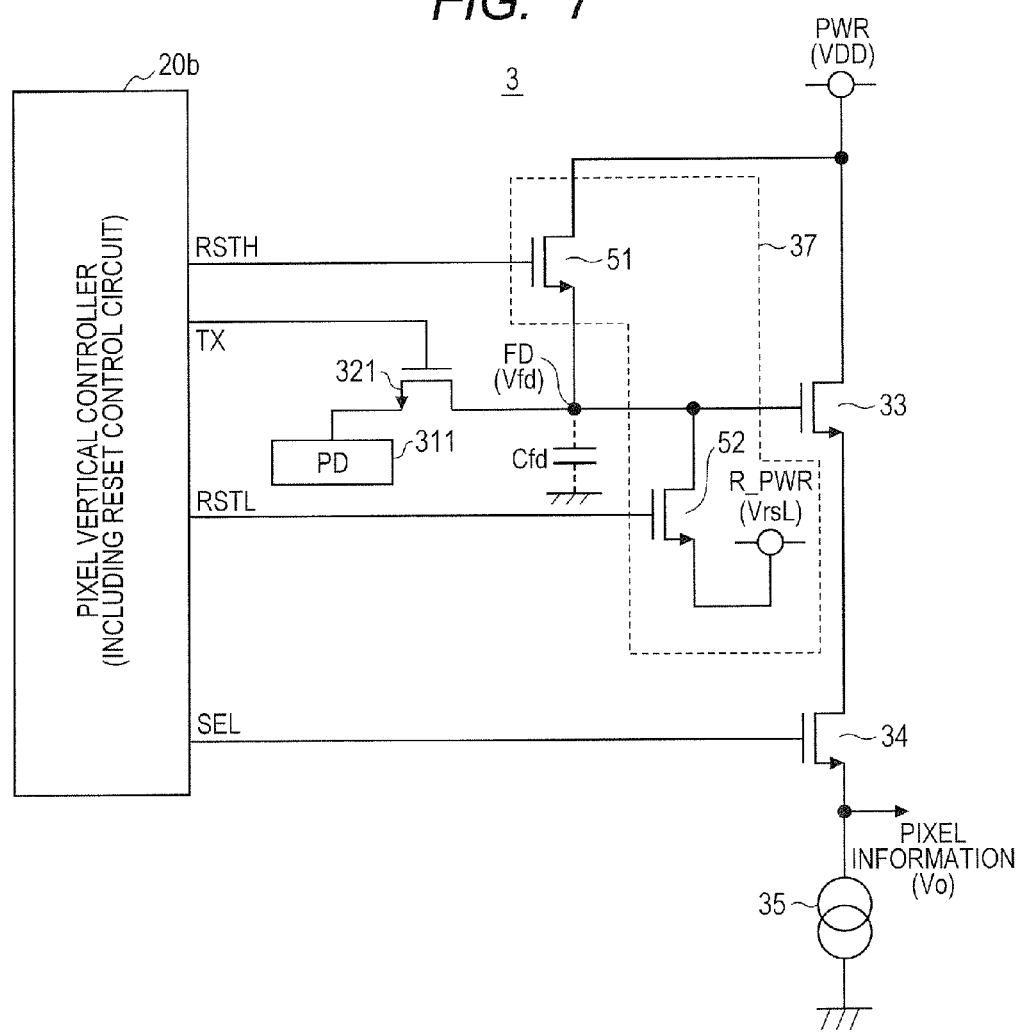
FIG. 7 is a circuit diagram of a pixel unit of an image sensing device according to a third embodiment.

In a third embodiment, a pixel unit 3 is described, which is a different embodiment from the pixel unit 1 according to the first embodiment FIG. 7 is circuit diagram of an pixel unit of an image sensing device according to the third embodiment.

As illustrated in FIG. 7, the pixel unit 3 according to the third embodiment is obtained by replacing the reset circuit 36 in the pixel unit 1 according to the first embodiment with a reset circuit 37. The reset circuit 37 includes a first reset transistor 51 and a second reset transistor 52. Further, a pixel vertical controller 20b including a reset control circuit outputs the read-out control signal TX, the selection signal SEL, a first reset control signal RSTH, and a second reset control signal RSTL. That is, in the third embodiment, are set control signal includes the first reset control signal RSTH and the second reset control signal RSTL.

The first reset transistor 51 is coupled at its drain to the power-source wire PWR through which the power-source voltage VDD is propagated, and is coupled at its source to the floating diffusion FD. To a gate of the first reset transistor 51, the first reset control signal RSTH is supplied. The second reset transistor 52 is coupled at its drain to the floating diffusion FD, and is coupled at its source to the reset power-source wire R_PWR through which the reset correction voltage VrsL is propagated. To a gate of the second reset transistor 52, the second reset control signal RSTL is supplied. Also in the third embodiment, the reset correction voltage VrsL is a voltage lower than a voltage (VDD−Vth) obtained by subtracting a threshold voltage Vth of the first reset transistor 51 from the power-source voltage VDD.

Figure 8:
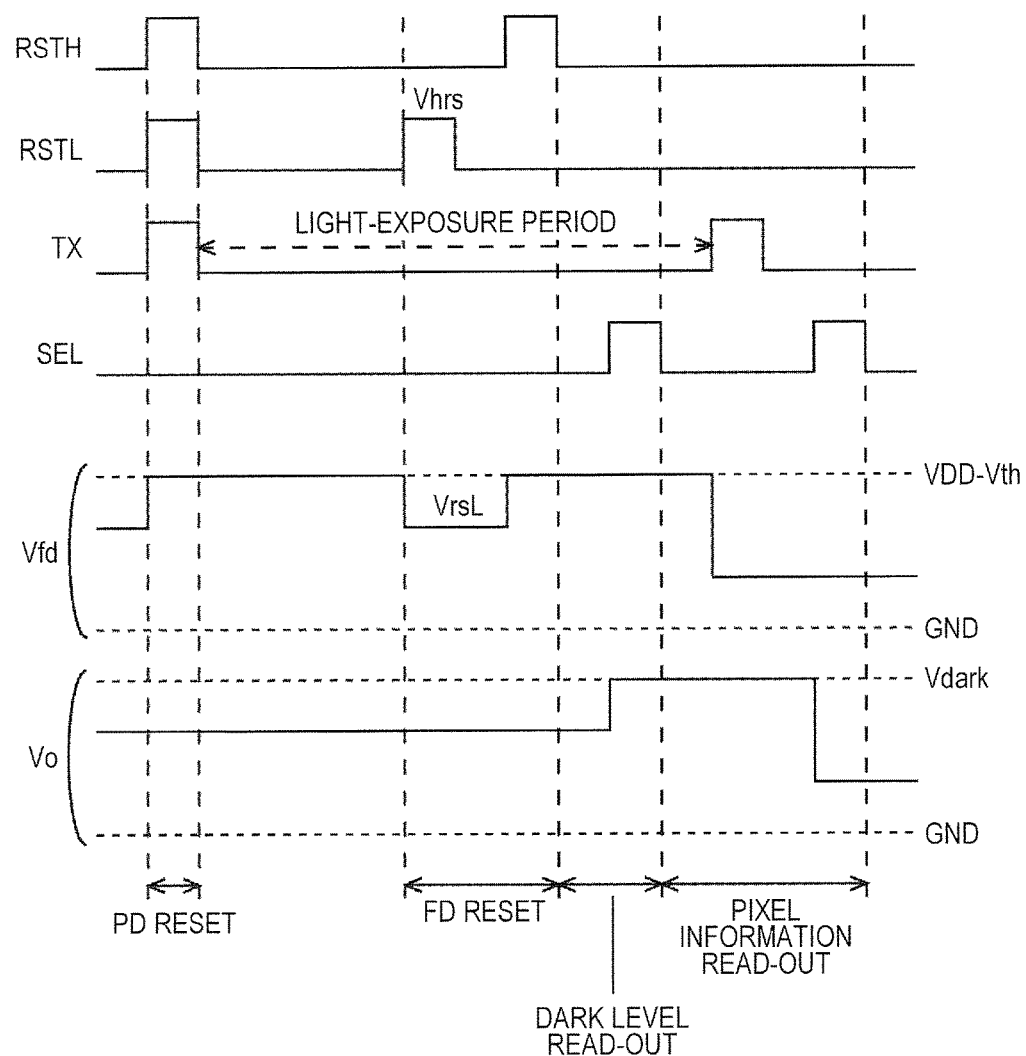
FIG. 8 is a timing chart illustrating an operation of the pixel unit of the image sensing device according to the third embodiment.

Next, an operation of the pixel unit 3 according to the third embodiment is described. FIG. 8 is a timing chart explaining the operation of the pixel unit of the image sensing device according to the third embodiment. As illustrated in FIG. 8, also in the third embodiment, PD reset, FD reset, a dark level read-out operation, and a pixel signal read-out operation are performed as in the first embodiment. The FD reset in the pixel unit 3 according to the third embodiment is different from that in the pixel unit 1 according to the first embodiment, and is therefore described below.

In the FD reset in the pixel unit 3 according to the third embodiment, while the first reset control signal RSTH is placed at a low level so that the first reset transistor 51 is placed in an off state, the second reset control signal RSTL is switched from a low level to a high level (e.g., the voltage Vhrs). Thus, in the pixel unit 3 according to the third embodiment, the reset correction voltage VrsL supplied to the source of the second reset transistor 52 via the reset power-source wire R_PWR is supplied to the floating diffusion FD. Note that the voltage Vhrs has the same potential as the power-source voltage VDD. Further, in the pixel unit 3 according to the third embodiment, the second reset transistor 52 is formed by an NMOS transistor, and the reset power-source wire R_PWR is coupled to the source of the second reset transistor 52. Therefore, by supplying the second reset control signal RSTL having the same potential as the power-source voltage VDD to the gate of the second reset transistor 52, it is possible to supply the reset correction voltage VrsL to the floating diffusion FD.

Thereafter, the pixel unit 3 according to the third embodiment switches the second reset control signal RSTL from the high level to the low level and switches the first reset control signal RSTH from the low level to a high level. Thus, in the pixel unit 3 according to the third embodiment, the voltage (VDD−Vth) obtained by subtracting the threshold voltage Vrth of the first reset transistor 51 from the power-source voltage VDD is supplied to the floating diffusion FD via the first reset transistor 51, so that the floating diffusion FD is reset.

From the above description, also in the pixel unit 3 according to the third embodiment, the voltage Vfd of the floating diffusion FD is set to the reset correction voltage VrsL, prior to supply of the reset level based on the power-source voltage VDD to the floating diffusion FD via the first reset transistor 51. Thus, also in the pixel unit 3 according to the third embodiment, it is possible to reduce a variation of the reset level of the floating diffusion FD as in the pixel unit 1 according to the first embodiment.

Further, also in the pixel unit 3 according to the third embodiment, it is possible to control a transistor while the maximum voltage of each control signal is set to the power-source voltage VDD or lower. Therefore, it is possible to configure a circuit by transistors with a breakdown voltage that matches the power-source voltage VDD, thus reducing the circuit scale.

In addition, the pixel unit 1 according to the first embodiment, the reset correction voltage VrsL is supplied to the drain of the reset transistor 41 by switching the voltage to be supplied to the drain of the reset transistor 41. Meanwhile, in the pixel unit 3 according to the third embodiment, the reset correction voltage is fixedly supplied to the source of the second reset transistor 52. Therefore, the pixel unit 3 according to the third embodiment can reduce the circuit scale because an operation for varying the voltage resetting the floating diffusion FD is eliminated. Furthermore, because the operation varying the voltage resetting the floating diffusion FD is eliminated, the pixel unit 3 according to the third embodiment can reduce power consumption, as compared with the pixel unit 1 according to the first embodiment.

Figure 14:
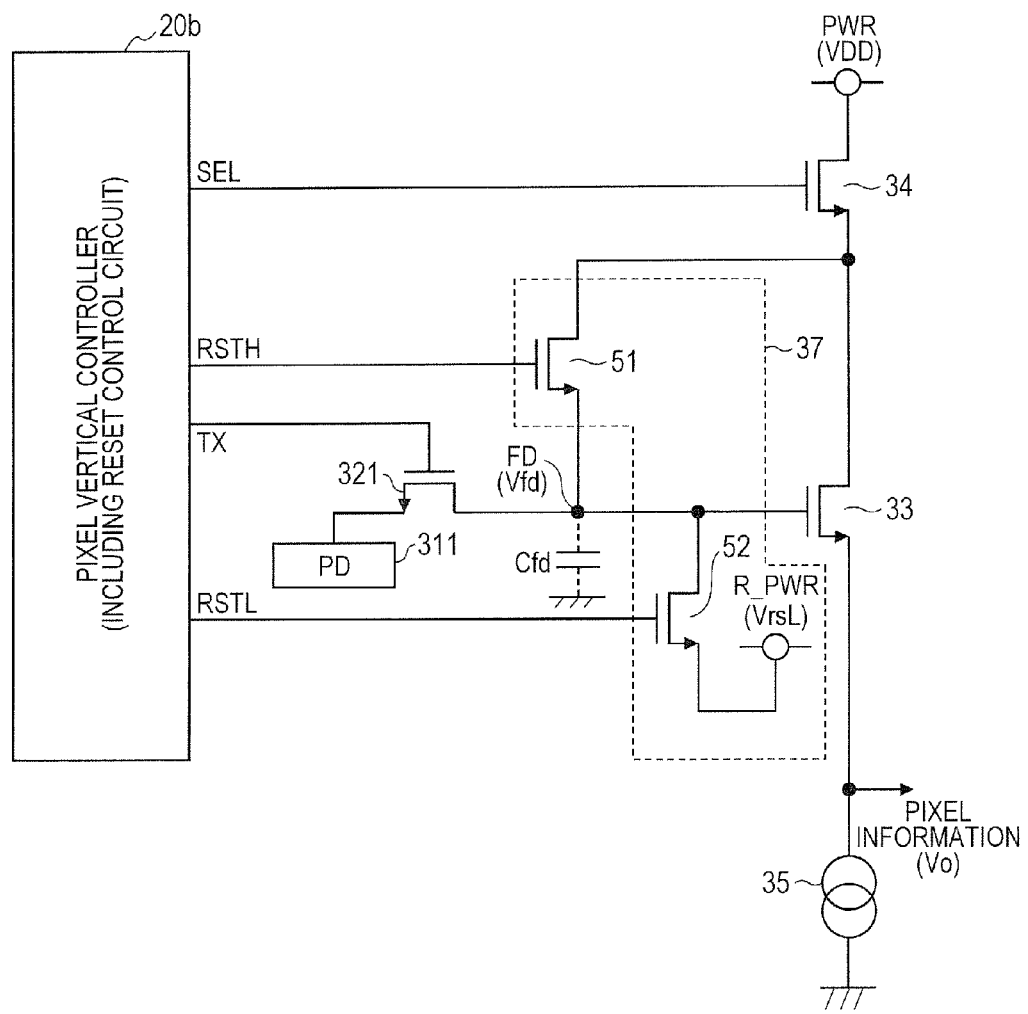
FIG. 14 is a circuit diagram of a modified example of the pixel unit of the image sensing device according to the third embodiment.

In addition, FIG. 14 is a circuit diagram of a pixel unit that is a modification of the pixel unit 3 according to the third embodiment. The pixel unit illustrated in FIG. 14 is configured so that the selection transistor 34 is coupled between the power-source line PWR and the drain of the amplification transistor 33.

Fourth Embodiment

Figure 9:
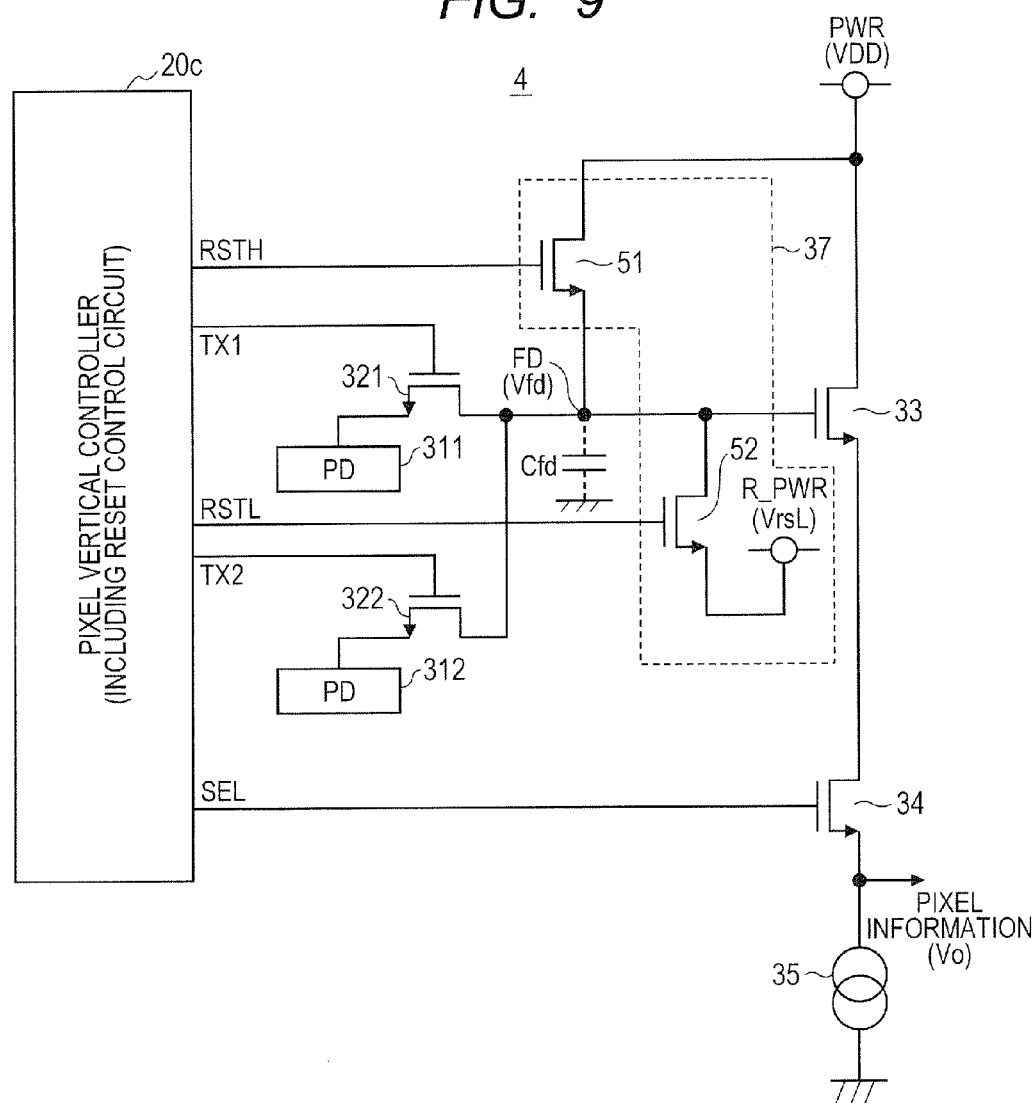
FIG. 9 is a circuit diagram of a pixel unit of an image sensing device according to a fourth embodiment.

In a fourth embodiment, a pixel unit 4 is described, which is a different embodiment from the pixel unit 3 according to the third embodiment. FIG. 9 is a circuit diagram of the pixel unit 4 of an image sensing device according to the fourth embodiment.

As illustrated in FIG. 9, the pixel unit 4 according to the fourth embodiment is obtained by adding another pair of the photodiode 31 and the transfer transistor 32 to the pixel unit 3 according to the third embodiment. In FIG. 9, the photodiode 31 and the transfer transistor 32 described in the third embodiment are labeled with 311 and 321, respectively. Also, in FIG. 9, the photodiode 31 and the transfer transistor 32 added in the fourth embodiment are labeled with 312 and 322, respectively. Further, a read-out control signal to be supplied to the transfer transistor 321 is labeled with TX1, and a read-out control signal to be supplied to the transfer transistor 322 is labeled with TX2.

Figure 10:
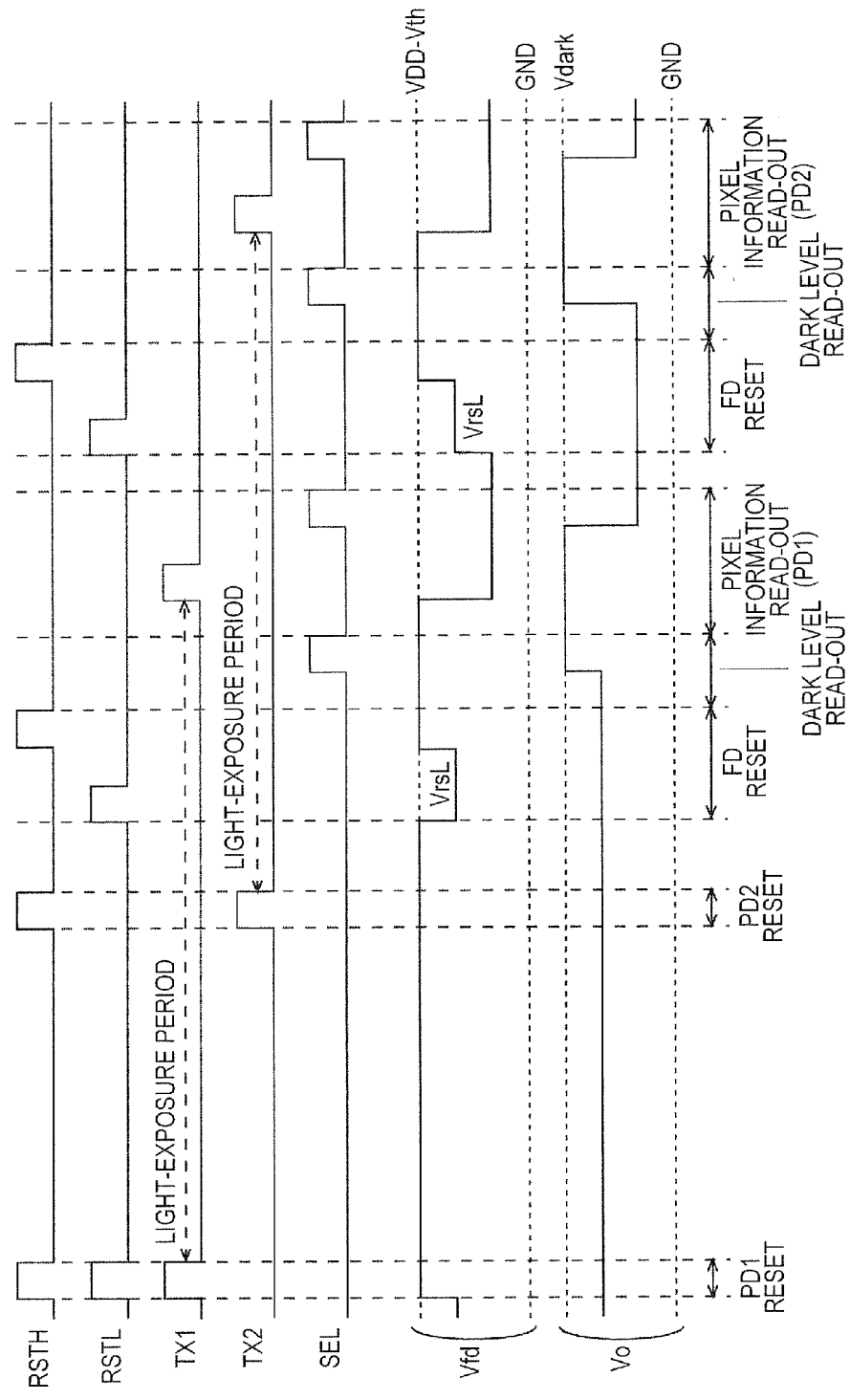
FIG. 10 is a timing chart illustrating an operation of the pixel unit of the image sensing device according to the fourth embodiment.

Next, an operation of the pixel unit 4 according to the fourth embodiment is described. FIG. 10 is a timing chart explaining the operation of the pixel unit 4 of the image sensing device according to the fourth embodiment.

As illustrated in FIG. 10, in the pixel unit 4 according to the fourth embodiment, PD1 reset and PD2 reset are performed in order, so that the photodiodes 311 and 312 are reset in order. These PD1 reset and PD2 reset are the same operation as the PD reset described referring to FIG. 4.

In the fourth embodiment, after completion of reset of the two photodiodes, FD reset, a dark level read-out operation, and a pixel signal read-out operation are performed in that order in order to read out pixel signal from the photodiode 311 that has been reset first. After completion of reading out of the pixel signal from the photodiode 311, the FD reset, the dark level read-out operation, and the pixel signal read-out operation are performed in that order in order to read out pixel signal from the photodiode 312. Also in the fourth embodiment, the FD reset, the dark level read-out operation, and the pixel signal read-out operation are substantially the same as the FD reset in the third embodiment described referring to FIG. 8 and the dark level read-out operation and the pixel signal read-out operation in the first embodiment described referring to FIG. 4.

From the above description, in the fourth embodiment, it suffices that one set of the amplification transistor 33, the selection transistor 34, and the reset circuit 37 is provided for two photodiodes. Therefore, the number of transistors required for one photodiode can be reduced, so that the circuit scale can be reduced.

Fifth Embodiment

Figure 11:
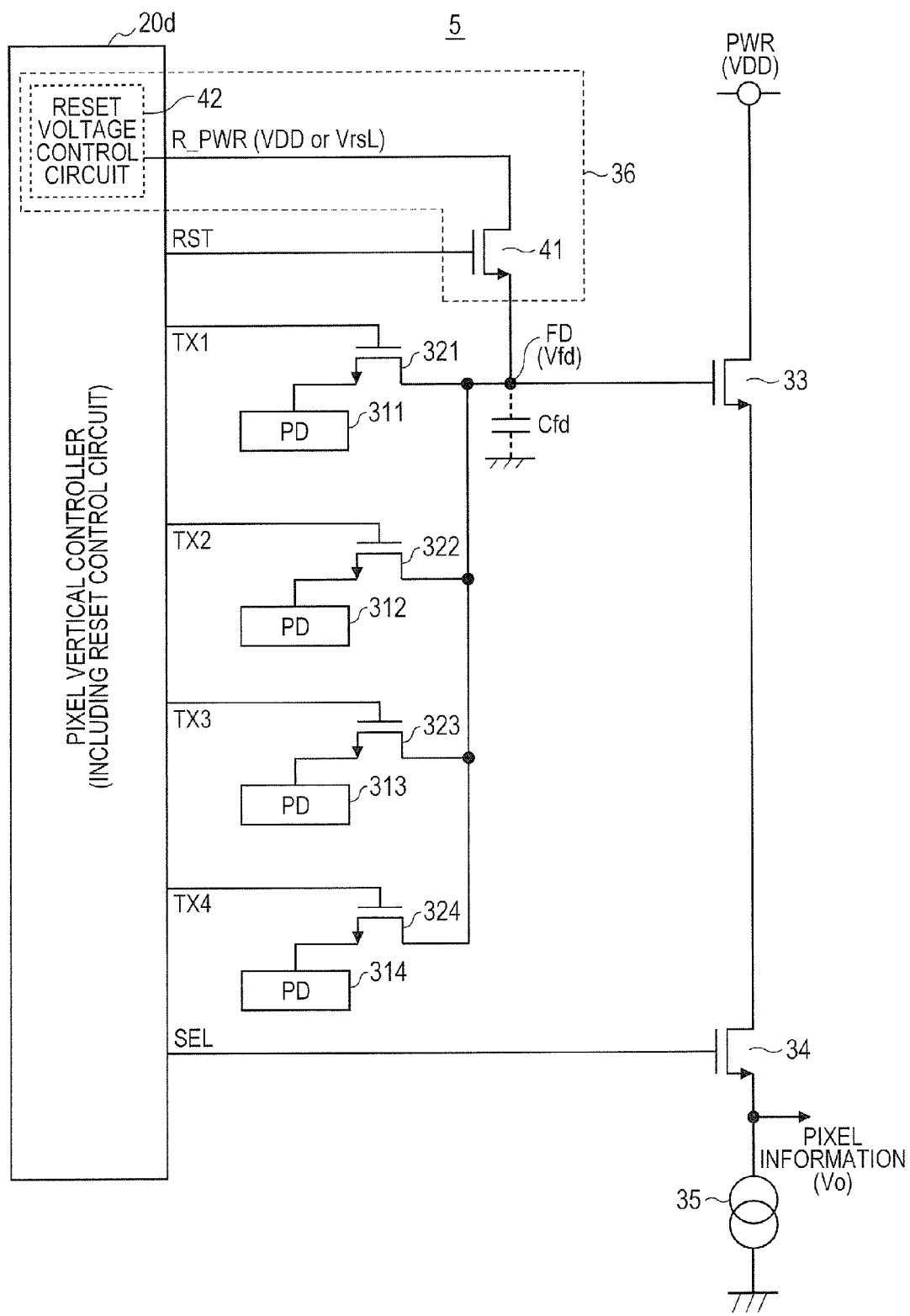
FIG. 11 is a circuit diagram of a pixel unit of an image sensing device according to a fifth embodiment.

In a fifth embodiment, a pixel unit 5 is described, which is a different embodiment from the pixel unit 2 according to the second embodiment. FIG. 11 is a circuit diagram of the pixel unit 5 of an image sensing device according to the fifth embodiment.

As illustrated in FIG. 11, the pixel unit 5 according to the fifth embodiment is obtained by adding two pairs of the photodiode 31 and the transfer transistor 32 to the pixel unit 2 according to the second embodiment. In FIG. 11, the photodiodes 31 added in the fifth embodiment are labeled with 313 and 314, and the transfer transistors 32 added in the fifth embodiment are labeled with 323 and 324. Also, a read-out control signal to be supplied to the transfer transistor 323 is labeled with TX3, and a read-out control signal to be supplied to the transfer transistor 324 is labeled with TX4. An operation of the pixel unit 5 according to the fifth embodiment can be easily understood by enlarging the operation of the pixel unit 2 according to the second embodiment to four photodiodes, and therefore the description thereof is omitted here.

In the pixel unit 5 according to the fifth embodiment, four photodiodes are coupled to one set of the amplification transistor 33, the selection transistor 34, and the reset circuit 36. Therefore, the circuit scale can be reduced, as compared with the first and second embodiments.

Sixth Embodiment

Figure 12:
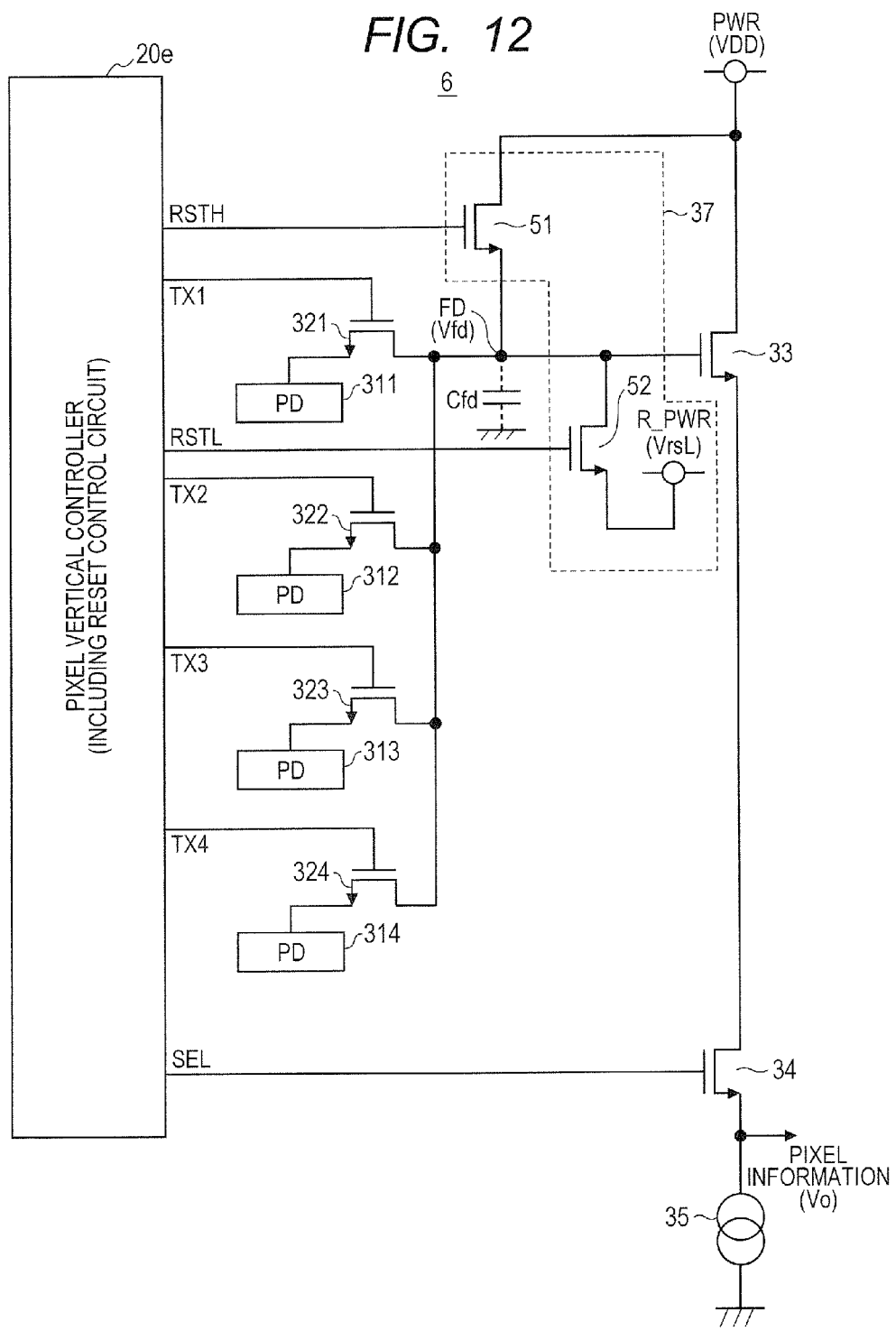
FIG. 12 a circuit diagram of a pixel unit of an image sensing device accord to a sixth embodiment.

In a sixth embodiment, a pixel unit 6 is described, which is a different embodiment from the pixel unit 4 according to the fourth embodiment. FIG. 12 is a circuit diagram of the pixel unit 6 of an image sensing device according to the sixth embodiment.

As illustrated in FIG. 12, the pixel unit. 6 according to the sixth embodiment is obtained by adding two pairs of the photodiode 31 and the transfer transistor 32 to the pixel unit 4 according to the fourth embodiment. In FIG. 12, the photodiodes 31 added in the sixth embodiment are labeled with 313 and 314, and the transfer transistors 32 added in the sixth embodiment are labeled with 323 and 324. Also, a read-out control signal to be supplied to the transfer transistor 323 is labeled with TX3, and a read-out control signal to be supplied to the transfer transistor 324 is labeled with TX4. An operation of the pixel unit 6 according to the sixth embodiment can be easily understood by enlarging the operation of the pixel unit 4 according to the fourth embodiment to four photodiodes, and therefore the description thereof is omitted here.

In the pixel unit 6 according to the sixth embodiment, four photodiodes are coupled to one set of the amplification transistor 33, the selection transistor 34, and the reset circuit 37. Therefore, the circuit scale can be reduced, as compared with the third and fourth embodiments.

In the above, the invention made by the inventors of the present application has been specifically described by way of the embodiments. However, it is naturally understood that the present invention is not limited to the aforementioned embodiments, and can be changed in various ways within the scope not departing from the gist thereof.

What is claimed is:

1. An image sensing device comprising:
a photoelectric conversion element;
a transfer transistor to read out an electric-charge from the photoelectric conversion element;
a floating diffusion to hold the electric-charge read out via the transfer transistor;
a reset circuit to switch a voltage to be supplied to the floating diffusion when the floating diffusion is reset;
an output wire to output an output signal generated based on the electric-charge held in the floating diffusion; and
a reset control circuit to instruct switching of the voltage supplied by the reset circuit to the floating diffusion, and output a reset control signal,
wherein the reset circuit supplies,
a first reset voltage based on a power-source voltage to the floating diffusion in a first reset operation that resets the floating diffusion and the photoelectric conversion element prior to a light-exposure period for exposing the photoelectric conversion element with light, and
supplies a second reset voltage based on a reset correction voltage lower than the power-source voltage to the floating diffusion and thereafter supplies the first reset voltage, in a second reset operation that resets the floating diffusion during the light-exposure period for exposing the photoelectric conversion element with the light.

2. The image sensing device according to claim 1,
wherein the reset circuit includes
a reset transistor in which a reset power-source wire is coupled to a drain, a source is coupled to the floating diffusion, and the reset control signal is supplied to a gate, and
a reset voltage control circuit to switch a voltage to be supplied to the drain of the reset transistor via the reset power-source wire, and
wherein in the second reset operation, the reset voltage control circuit switches the voltage to be supplied to the drain of the reset transistor from the reset correction voltage to the power-source voltage, while the reset transistor is in a conductive state by the reset control signal.

3. The image sensing device according to claim 2,
wherein the reset correction voltage is lower than a voltage obtained by subtracting a threshold voltage of the reset transistor from the power-source voltage.

4. The image sensing device according to claim 2,
wherein a maximum voltage of the reset control signal is the power-source voltage.

5. The image sensing device according to claim 1,
wherein the reset control signal includes a first reset control signal and a second reset control signal,
wherein the reset circuit includes
a first reset transistor in which a power-source wire through which the power-source voltage is propagated is coupled to a drain, a source is coupled to the floating diffusion, and the first reset control signal is supplied to a gate, and
a second reset transistor in which a drain coupled to the floating diffusion, a reset power-source wire through which the reset correction voltage is propagated is coupled to a source, and the second reset control signal is supplied to a gate.

6. The image sensing device according to claim 5,
wherein the reset correction voltage is lower than a voltage obtained by subtracting a threshold voltage of the first reset transistor from the power-source voltage.

7. The image sensing device according to claim 5,
wherein maximum voltages of the first reset control signal and the second reset control signal are the power-source voltage.

8. The image sensing device according to claim 1,
wherein at least two pairs of the photoelectric conversion element and the transfer transistor are provided.

9. The image sensing device according to claim 1, further comprising:
an amplification transistor to amplify a voltage generated in the floating diffusion and generate the output signal; and
a selection transistor provided between a source of the amplification transistor and the output wire.

10. The image sensing device according to claim 1, further comprising:
an amplification transistor to amplify a voltage generated in the floating diffusion and generate the output signal; and
a selection transistor provided between a drain of the amplification transistor and a power-source wire.

11. The image sensing device according to claim 5,
wherein at least two pairs of the photoelectric conversion element and the transfer transistor are provided.

12. The image sensing device according to claim 5, further comprising:
an amplification transistor to amplify a voltage generated in the floating diffusion and generate the output signal; and
a selection transistor provided between a drain of the amplification transistor and a power-source wire.

13. The image sensing device according to claim 1, wherein the reset circuit comprises:
a reset transistor, wherein in the second reset operation, a voltage to be supplied to a drain of the reset transistor is switched from the reset correction voltage to the power-source voltage, while the reset transistor is in a conductive state by the reset control signal.

* * * * *